VOLTAGE COMPENSATION
Filed Dec. 14, 1959
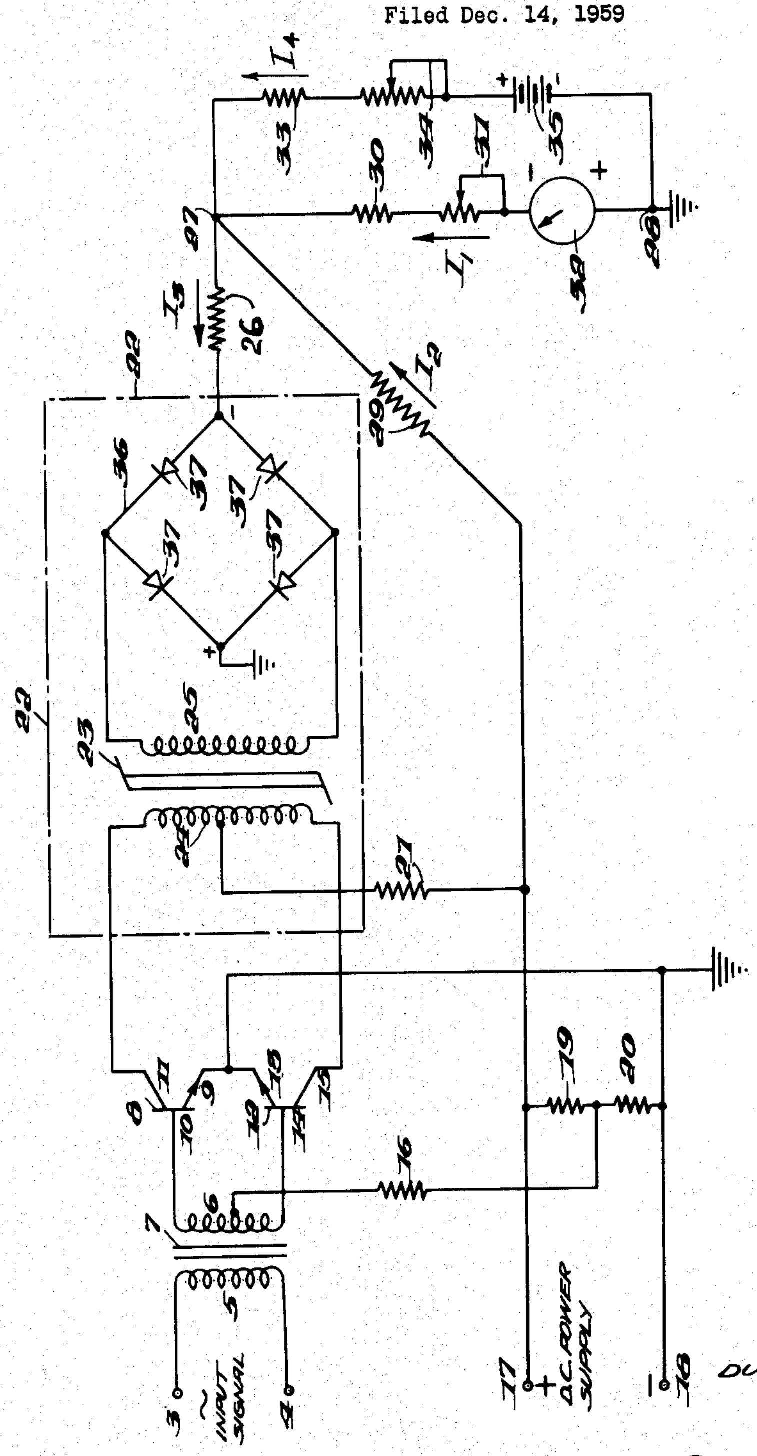
INVENTOR
DUDLEY D. NYE, JR.
BY Stevens, Davis, Miller & Mosher
ATTORNEYS

United States Patent Office 3,021,480

Patented Feb. 13, 1962

3,021,480

VOLTAGE COMPENSATION

Dudley D. Nye, Jr., Fort Lauderdale, Fla., assignor to Airpax Electronics Incorporated, Fort Lauderdale, Fla., a corporation of Maryland Filed Dec. 14, 1959, Ser. No. 859,478

1 Claim. (Cl. 324—78)

This invention relates to voltage compensation for electric circuits, and more particularly to frequency detectors whose outputs are independent of supply line or power supply variations.

One type of frequency detector, to which the principles of the invention apply, is known as a Magmeter. Magmeter is a trade name used by Airpax Electronics Incorporated, Fort Lauderdale, Florida, to represent a frequency detecting circuit delivering a D.C. output voltage proportional to the frequency of the input signal. The basic frequency detecting circuit consists of a saturating transformer and an output rectifier circuit. If the power from the input signal is not sufficient to drive the frequency detecting circuit, an amplifier would be used, and as a consequence, would require a power supply. Ideally, when the variable frequency input signal is of sufficient amplitude to cause core saturation, a further increase in amplitude will not change the D.C. output signal. Thus the characteristics of a true F.M. discriminator are attained. This invention deals with a small second order effect, resulting from variations in the power supply voltage to the Magmeter driver amplifier, which occurs since the circuit departs from the ideal theoretical characteristics.

The use of a power supply, while needed for the amplifier, gives rise to certain disadvantages and drawbacks. Power supply variations cause variations in signal amplitude and are reflected through the frequency detecting circuit and appear as small current changes at the output. Those output current changes of the frequency detecting circuit must be compensated to provide an improved circuit for applications requiring the ultimate in accuracy. No less expensive or less complicated alternative methods have been suggested that will eliminate the output current changes due to power supply variations.

It is the principal aim of this invention to provide a simple and inexpensive method to overcome the difficulties and disadvantages arising from power supply variations. This is accomplished by the present invention by providing a current-path means, which consists of a resistor connected between the power supply and the output of the frequency detecting circuit. Power supply variations cause current changes in the resistor, which appear at the output. The current changes in the resistor can be set to compensate for the offset current changes due to power supply variations. Accordingly, the expedient of the present invention has the result of making the output of the frequency detecting circuit independent of power supply variations. With suitable stabilization achieved at the output of the frequency detecting circuit, the invention provides an improved frequency detector, capable of accurate and precise frequency detection.

It is, therefore, the main object of this invention to provide a simple and inexpensive method of making the output of a detecting circuit independent of power supply variations.

Another object of this invention is to provide an improved frequency detecting circuit, which features means adapted to supply a compensating current to the output of the detecting circuit so that the output will not change with changes in power supply.

Other objects and advantages of the invention will become apparent from the following detailed description of a preferred embodiment of the invention when taken with the drawing which shows in the sole FIGURE schematic diagram of a preferred embodiment of the invention.

Referring now to the sole FIGURE, there is shown a frequency detecting circuit 22, known as a Magmeter. It is appreciated that the circuit 22 is not restricted to a frequency detecting circuit, but may also be a voltage detecting circuit or other suitable detecting circuits. The frequency detecting circuit 22, as previously mentioned, delivers a D.-C. output voltage proportional to the frequency of an input signal. It consists of a saturating transformer 23 having a primary winding 24 and a secondary winding 25 and a rectifying bridge 36. The core of saturating transformer 23 has a square hysteresis loop. The rectifier bridge 36, consisting of four diodes 37, is connected across the secondary winding 25 of saturating transformer 23. The output terminals 27 and 28 of the frequency detecting circuit 22 are connected to rectifier bridge 36 through resistor 26.

A push-pull transistor amplifier is used to supply the power required to drive the frequency detecting circuit 22. It is appreciated that the amplifier is not restricted to a transistor amplifier, but may also be a tube amplifier. The amplifier consists of two NPN transistors 8 and 12. Transistor 8 consists of an emitter 9, a base 10, and a collector 11, while transistor 12 consists of an emitter 13, a base 14, and a collector 15. The emitters 9 and 13 of transistors 8 and 12 are connected together. The collectors 11 and 15 of the transistors 8 and 12 are connected to the primary winding 24 of transformer 23. An input signal is connected across terminals 3 and 4 in the ordinary manner. An input transformer 7 is used to couple the input signal to the bases 10 and 14 of the transistors 8 and 12.

A D.-C. power supply is connected across terminals 17 and 18 in the ordinary manner. Terminal 18 or the negative side of the D.-C. power supply is connected to the common junction of emitters 9 and 13 of transistors 8 and 12. Terminal 17 or the positive side of the D.-C. power supply is connected to the center tap of primary winding 24 of transformer 23 through resistor 21. A voltage divider, consisting of resistors 19 and 20 is connected between the terminals 17 and 18. A bias is provided for the bases 10 and 14 of transistors 8 and 12 by connecting the common junction of resistors 19 and 20 to the center tap of secondary winding 6 of transformer 7 through resistor 16.

The input signal drives the transistor amplifier into saturation such that a square-wave output appears across the collectors 11 and 15 of transistors 8 and 12. The square-wave output, which consists of alternately positive and negative pulses, is applied to the primary winding 24 of the transformer 23. The saturating transformer 23 alters the input pulses so that the output across the secondary winding 25 consists of rectangular pulses having essentially constant volt-second areas. The bridge 36 rectifies the alternately positive and negative rectangular pulses appearing across the secondary winding 25 in a manner well known in the art. The resulting rectified output of the frequency detecting circuit 22 is a series of constant area rectangular pulses. The average value of the output of the frequency detecting circuit 22 is proportional to the frequency of the input signal, connected across the terminals 3 and 4. The amplitude of the square-wave signal applied to winding 24 of transformer 23 has only a second order effect on the D.-C. output of circuit 22.

An indicating means, shown in the drawing as an ammeter 32, is connected across the output terminals 27 and 28 through resistor 30 and calibrating rheostat 31. It is appreciated that the indicating means 32 is not restricted to an ammeter, but may also be a recorder or other suitable indicators. A reference voltage, shown in the drawing as a battery 35, is connected across the output terminals 27 and 28 through resistor 33 and calibrating rheostat 34. The ammeter 32 can be calibrated to measure a given range of frequencies of the input signal by adjusting rheostats 31 and 34 to give full-scale and zero readings on the ammeter at maximum and minimum input signal frequencies. By this method, it is possible to expand the scale of the ammeter so that accuracy and readibility of frequency indication over a specific region can be improved. In order to obtain zero current in the ammeter when the frequency of the input signal is at the low end of the calibration range, the current $I_4$ supplied by the reference voltage from battery 35 is adjusted by rheostat 34 so that it opposes the current appearing at the output terminal 27 due to the minimum input signal frequency. The average current flowing through the ammeter 32 can then be set to zero. When the frequency of the input signal is at the high end of the desired calibration range, the rheostat 31 is adjusted to make the ammeter read full scale.

In order to regulate or stabilize the output for power supply variations, a current path means is provided and consists of a resistor 29 connected between the positive or input terminal 17 of the power supply and the output terminal 27 of the frequency detecting circuit 22. With power supply variations, there will be current changes in resistor 29, which appear at the output terminal 27. The power supply variations will also be reflected through the frequency detecting circuit 22, and appear as current changes at the output terminal 27. The resistor 29 is properly chosen so that its current changes appearing at output terminal 27 compensates for offset current changes appearing at output terminal 27 due to the power supply variations of frequency detecting circuit 22.

Accordingly, the best mode for carrying out the invention is as follows. An input signal having a fixed frequency is applied across terminals 3 and 4. This input signal causes a current to flow through ammeter 32. The scale reading on the ammeter 32 indicates the frequency of the input signal. Assume there is an increase in the power supply voltage applied to terminals 17 and 18. Due to the fact that the Magmeter and rectifying diodes depart slightly from the ideal, the increase in power supply voltage is reflected through the transformer 23, and appears as an increase in voltage across the secondary winding 25. This increase in voltage causes the current $I_1$ flowing through the ammeter 32 to increase. The increased current $I_1$ causes the scale reading on the ammeter 32 to go up slightly. Thus a variation in power supply voltage results in an erroneous or incorrect scale reading on the ammeter 32 for the fixed input frequency.

Let us assume that the frequency of the input signal is fixed as mentioned before. An increase in the power supply voltage is reflected through the transformer 23, and appears as an increase in voltage across the secondary winding 25. With increased voltage across the secondary winding 25 of the transformer 23, the current $I_3$ flowing through resistor 26 must increase. The increase of the power supply voltage also causes the current $I_2$ flowing through resistor 29 to increase. This increase in compensating current $I_2$ flowing through resistor 29 permits current $I_3$ to increase without an increase in current $I_1$. Mathematically the sum of the currents entering terminal 27 must be equal to the current leaving this terminal. The current $I_1$ flowing through ammeter 32 is now independent of power supply variations. The ammeter 32 gives a correct reading for the input frequency.

The above detailed description of the circuit was for an increase in power supply voltage. The description is similar for a decrease in power supply voltage.

Although the present invention has been shown and described in terms of a specific preferred embodiment, changes and modifications which do not depart from the inventive concepts taught herein will suggest themselves to those skilled in the art. Such changes and modifications are deemed to fall within the scope and contemplations of the invention.

What is claimed is:

A stabilized frequency detecting circuit comprising a core material having a substantially rectangular hysteresis characteristic, first and second mutually inductive windings wound thereon, rectifying means comprising diodes connected to one of said windings, an amplifier means comprising a pair of matched transistors having emitter, base and collector electrodes, said collector electrodes connected to the other of said windings, a power supply means connected to said amplifier means, an indicating means connected to the output of said detecting circuit, and means establishing a current path between said power supply and the output to supply a current of sufficient magnitude to compensate for an offset current in said detecting circuit so that the current flowing through said indicating means is maintained constant with variations in said power supply means.

References Cited in the file of this patent

UNITED STATES PATENTS

| | | |
|---|---|---|
| 2,318,061 | Dailey | May 4, 1943 |
| 2,523,399 | Stoner et al. | Sept. 26, 1950 |